United States Patent
Chang et al.

(10) Patent No.: US 9,346,449 B1
(45) Date of Patent: May 24, 2016

(54) FAULT WARNING METHOD AND SYSTEM THEREOF OF ELECTRIC PARKING BRAKE

(71) Applicant: Automotive Research & Testing Center, Changhua County (TW)

(72) Inventors: Liang-Cheng Chang, Changhua County (TW); Jiun-Jie Chen, Changhua County (TW); Shih-Chieh Huang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 32 days.

(21) Appl. No.: 14/583,116

(22) Filed: Dec. 25, 2014

(51) Int. Cl.
F16D 66/00 (2006.01)
B60T 17/22 (2006.01)
H02P 29/02 (2016.01)
H02P 7/00 (2016.01)

(52) U.S. Cl.
CPC ............... B60T 17/221 (2013.01); H02P 7/00 (2013.01); H02P 29/021 (2013.01)

(58) Field of Classification Search
CPC ..... B60T 17/081; B60T 17/085; B60T 17/22; B60T 8/1703; F16D 65/28; F16D 66/021; F16D 66/025; F16D 66/00; F16D 66/024; F16D 66/026; F16D 2066/003; F16D 2066/005
USPC .......... 188/1.11 E, 1.11 L; 303/3, 20, 122.04, 303/122.05; 318/612–614, 56–66, 86–88, 318/400.09, 703, 741, 757, 759–765, 258, 318/261, 269, 273, 362, 370–376, 779, 318/799; 340/453, 454
See application file for complete search history.

(56) References Cited

U.S. PATENT DOCUMENTS

| | | | | |
|---|---|---|---|---|
| 8,692,499 B2* | 4/2014 | Kim | ........................ | B60T 13/74 303/62 |
| 8,886,433 B2* | 11/2014 | Konishi | .................. | B60T 8/885 318/362 |
| 2002/0026272 A1* | 2/2002 | Yamamoto | ............ | B60T 8/3255 701/70 |
| 2006/0163939 A1* | 7/2006 | Kuramochi | ............. | B60T 8/885 303/122.04 |
| 2009/0026998 A1* | 1/2009 | Ueno | ........................ | B60L 7/14 318/703 |
| 2010/0072811 A1* | 3/2010 | Kondo | .................. | B60T 13/741 303/20 |

* cited by examiner

*Primary Examiner* — Robert A Siconolfi
*Assistant Examiner* — San Aung
(74) *Attorney, Agent, or Firm* — CKC & Partners Co., Ltd.

(57) ABSTRACT

A fault warning method of an electric parking brake is provided. The fault warning method includes, a brake is actuated with a motor. An armature current is transmitted from the motor. The armature current is converted to a low frequency current and a high frequency current. A braking force is estimated by the by the low frequency current, and a motor rotating speed is estimated by the high frequency current. The braking force is compared with a predetermined braking force range, and a braking force comparing signal is outputted. The motor rotating speed is compared with a predetermined rotating speed range, and a rotating speed comparing signal is outputted. A determining result is generated by determining the braking force comparing signal and the rotating speed comparing signal. And a warning signal is generated according to the determining result.

14 Claims, 6 Drawing Sheets

FAULT WARNING METHOD AND SYSTEM THEREOF OF ELECTRIC PARKING BRAKE

BACKGROUND

1. Technical Field

The present disclosure relates to an electric parking brake. More particularity, the present disclosure relates to an electric parking brake fault warning method and system thereof.

2. Description of Related Art

The conventional parking brake is installed on a vehicle for actuating the brake by manually pulling a cable to stably park the vehicle. The braking force of the conventional parking brake is relative to an urging force providing from a user. If the user forgets to apply the parking brake, it may lead an accident caused by the vehicle sliding.

In order to solve the above problems, an electric parking brake with a motor for providing a regular braking force is applied on the vehicle. The user activates the electric parking brake for stopping the vehicle just by a simple action such as pressing or pulling a button. However, the electric parking brake actuates the brake through a mechanical structure and the motor, the user cannot directly get a feedback of the electric parking brake to recognize that the braking force is enough for stopping the vehicle. As a part of the mechanical structure is malfunction, the electric parking brake could not efficiently stop the vehicle.

For obtaining the braking force immediately, the electric parking brake with a force sensor is provided. There are two types of the electric parking brake with force sensor, such as a cable type and a caliper type, wherein the cable type actuates the brake by driving a cable with a motor, and the caliper type actuates the brake by driving a caliper with a motor directly. Therefore, the force sensor is coupled with the cable or the caliper to detect the braking force. However, the force sensor operates in a high temperature and serious dusty condition causing from a regular brake using during driving, the operation of the force sensor would be affected easily, and the life time of the force sensor would be reduced.

Moreover, the electric parking brake with the force sensor is operated by a feedback from the force sensor. Once the force sensor is malfunction, the above electric parking brake cannot be operated precisely. Furthermore, the user cannot recognize the operating situation of the electric parking brake through the feedback of the force sensor.

SUMMARY

According to one aspect of the present disclosure, a fault warning method of an electric parking brake is provided. The fault warning method includes, a brake is actuated with a motor. An armature current is transmitted from the motor. The armature current is converted to a low frequency current and a high frequency current. A braking force is estimated by the by the low frequency current, and a motor rotating speed is estimated by the high frequency current. The braking force is compared with a predetermined braking force range, and a braking force comparing signal is outputted. The motor rotating speed is compared with a predetermined rotating speed range, and a rotating speed comparing signal is outputted. A determining result is generated by determining the braking force comparing signal and the rotating speed comparing signal. And a warning signal is generated according to the determining result.

According to another aspect of the present disclosure, a fault warning system of an electric parking brake is provided. The fault warning system includes a brake, a DC motor, a current sensing module, a signal processing module and a warning module. The DC motor is coupled to the brake, and for transmitting an armature current. The current sensing module connects to the DC motor, and the current sensing module includes a low pass filter for converting the armature current to a low frequency current and a bandpass filter for converting the armature current to a high frequency current. The signal processing module connects to the current sensing module, and the signal processing module includes an estimating unit, a comparing unit and a determining unit. The estimating unit receives the low frequency current for estimating a braking force and the high frequency current for estimating a motor rotating speed. The comparing unit connects to the estimating unit, and the comparing unit includes a predetermined braking force range and a predetermined rotating speed range. The comparing unit compares the braking force with the predetermined braking force range and compares the motor rotating speed with the predetermined rotating speed range, and the comparing unit outputs a braking force comparing signal and a rotating speed comparing signal. The determining unit connects to the comparing unit for analyzing the braking force comparing signal and the rotating speed comparing signal and generating a determining result. The warning module connects to the signal processing module, and the warning module receives the determining result for generating a warning signal.

BRIEF DESCRIPTION OF THE DRAWINGS

The present disclosure can be more fully understood by reading the following detailed description, with reference made to the accompanying drawings as follows.

DETAILED DESCRIPTION

Figure 1:
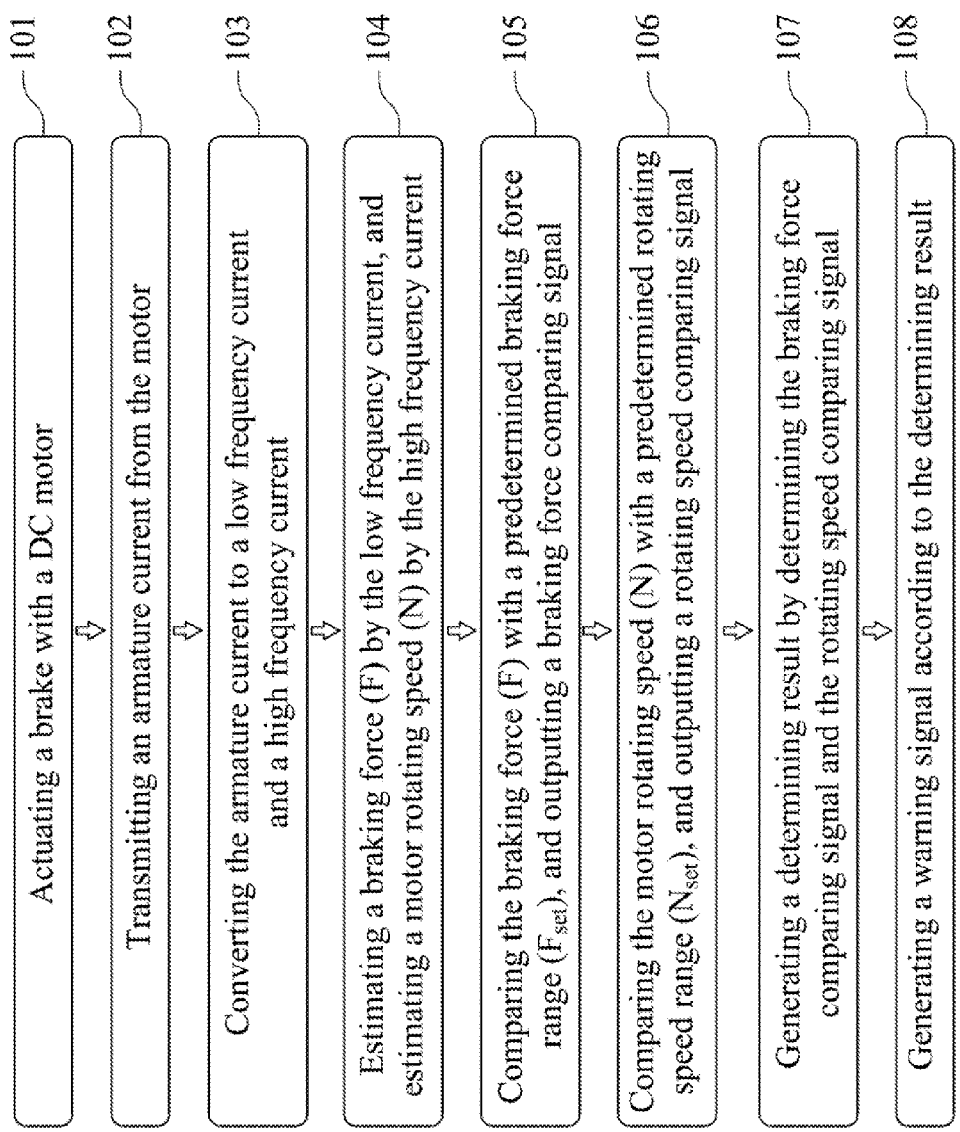
FIG. 1 is a flowchart of a fault warning method of an electric parking brake according to one embodiment of the present disclosure.

FIG. 1 is a flowchart of a fault warning method of an electric parking brake according to one embodiment of the present disclosure. According to the embodiment of FIG. 1, the motor is a DC motor. The fault warning method of the electric parking brake includes the following steps.

Step 101, a brake is actuated with a DC motor.

Step 102, an armature current is transmitted from the DC motor.

Step 103, the armature current is converted to a low frequency current and a high frequency current.

Step 104, a braking force (F) is estimated by the by the low frequency current, and a motor rotating speed (N) is estimated by the high frequency current.

Step 105, the braking force (F) is compared with a predetermined braking force range ($F_{set}$), and a braking force comparing signal is outputted.

Step 106, the motor rotating speed (N) is compared with a predetermined rotating speed range ($N_{set}$), and a rotating speed comparing signal is outputted.

Step 107, a determining result is generated by determining the braking force comparing signal and the rotating speed comparing signal.

Step 108, a warning signal is generated according to the determining result.

In step 101, the DC motor is a brushed DC motor, and the brushed DC motor drives a caliper to clamp a disk rotor for braking.

Figure 2:
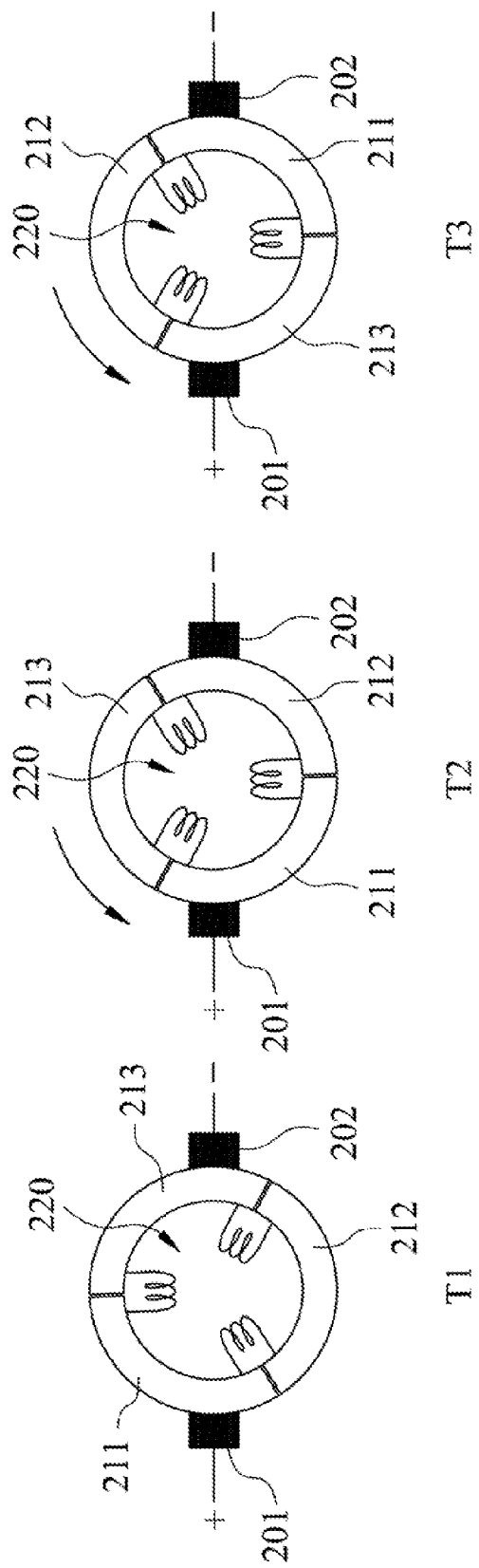
FIG. 2 is a schematic diagram showing the internal operating relationship of a brushed DC motor.
Figure 3:
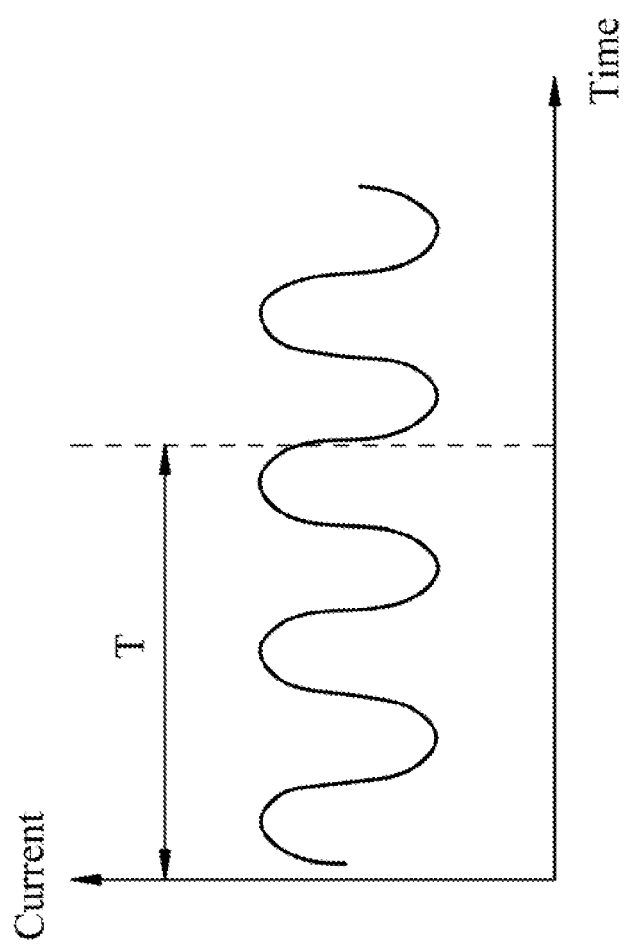
FIG. 3 is a schematic diagram showing a vibration of an armature current during the brushed DC motor operation.

FIG. 2 is a schematic diagram showing three states of a brushed DC motor at times T1, T2 and T3 in step 102 of FIG. 1. FIG. 3 is a schematic diagram showing a vibration of an armature current during the brushed DC motor operation in step 102 of FIG. 1. In FIGS. 2 and 3, the brushed DC motor includes a rotor coil 220, two brushes 201, 202 and three commutators 211, 212, 213. The commutators 211, 212, 213 are rotated with the brushed DC motor and relatively displaced with the rotor coils 220 during the brushed DC motor operation. When the brushed DC motor is counterclockwise rotated as shown in FIG. 2, the commutator 211 contacts the brush 201 by rotating of the brushed DC motor at time T1, the commutator 211 is about to leave the brush 201 at time T2, and the commutator 211 contacts the brush 202. At the same time, the commutators 212, 213 are individually and counterclockwise rotated, thus the commutators 212, 213 contact or leave the brush 201, 202, respectively. The brushed DC motor generates an armature current inducing by a counter-electromotive force due to a current which flows through the rotor coils 220. The armature current $i_a$ is continuously commutated according to the commutators 211, 212, 213 which are rotated continuously between the brushes 201, 202 and the rotor coils 220. In addition, the armature current $i_a$ is varied with time such as a ripple signal as shown in FIG. 3.

Figure 4:
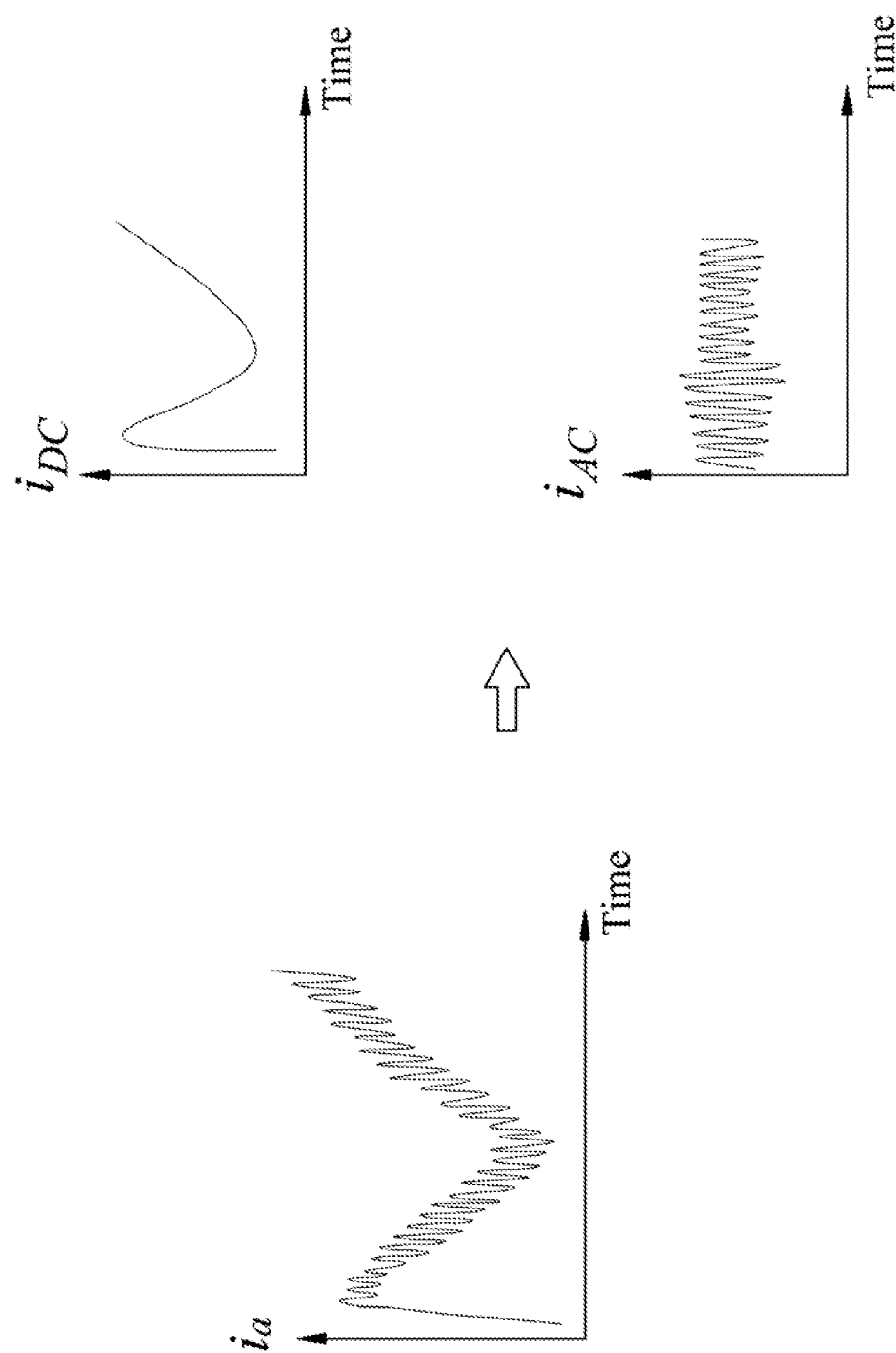
FIG. 4 is a schematic diagram showing the armature current being converted to a low frequency current and a high frequency current.

FIG. 4 is a schematic diagram showing the armature current being converted to a low frequency current and a high frequency current in step 103 of FIG. 1. In FIG. 4, the armature current $i_a$ is converted to a low frequency current $i_{DC}$ and a high frequency current $i_{AC}$, wherein the low frequency current $i_{DC}$ is a direct current and the high frequency current $i_{AC}$ is an alternating current. In step 104, the braking force (F) is estimated by the low frequency current $i_{DC}$ with the following formula (1):

$$i_{DC} = \frac{V_a - \omega_r K_e \varphi_{pm}}{R_a}, \qquad (1)$$

wherein $V_a$ is a motor input voltage, $\omega_r$ is a motor rotating speed, $K_e$ is a motor torque constant, $\varphi_{pm}$ is a magnetic flux, and $R_a$ is an armature resistance. Further, the motor rotating speed (N) is estimated by the high frequency current $i_{AC}$ with the following formula (2):

$$f = \frac{lcm(2p, k) \times N}{60}, \qquad (2)$$

wherein f is a frequency of $i_{AC}$, p is a pole number of the motor, k is a commutator number of the motor, N is the motor rotating speed, and lcm (2p, k) is a least common multiple of the double of the pole number of the motor and the commutator number of the motor.

In step 105, the braking force (F) is compared with the predetermined braking force range ($F_{set}$), and then the braking force comparing signal is generated and outputted. In step 106, the motor rotating speed (N) is compared with a predetermined rotating speed range ($N_{set}$), and then the rotating speed comparing signal is generated and outputted. In step 107, after determining the braking force comparing signal and the rotating speed comparing signal, the determining result for presenting a real-time status of the electric parking brake is generated. The determining result is a loosening of brake, a jam of brake, an insufficient braking force of brake, an abnormality of brush or a normal situation. In step 108, the warning signal corresponding with the determining result for reminding a user is generated, wherein the warning signal is a sound, a light, a pattern, a vibration, an image, or an electric control signal.

When the determining result is the insufficient braking force of brake, an auxiliary braking signal is further generated to control the brushed DC motor for providing an auxiliary braking force.

The fault warning method of the present disclosure estimates the braking force (F) and the motor rotating speed (N) by analyzing the variation of the low frequency current $i_{DC}$ and the high frequency current $i_{AC}$ during the brushed DC motor operating. Moreover, the fault warning method determines the operating status of the electric parking brake with the predetermined braking force range ($F_{set}$) and the predetermined rotating speed range ($N_{set}$), and the fault warning method immediately reminds the user according to the determining result. Furthermore, the fault warning method can determine the operating status of the electric parking brake without external sensor, thus the manufacturing cost of the electric parking brake can be reduced and the sensor damages can be prevented.

Figure 5:
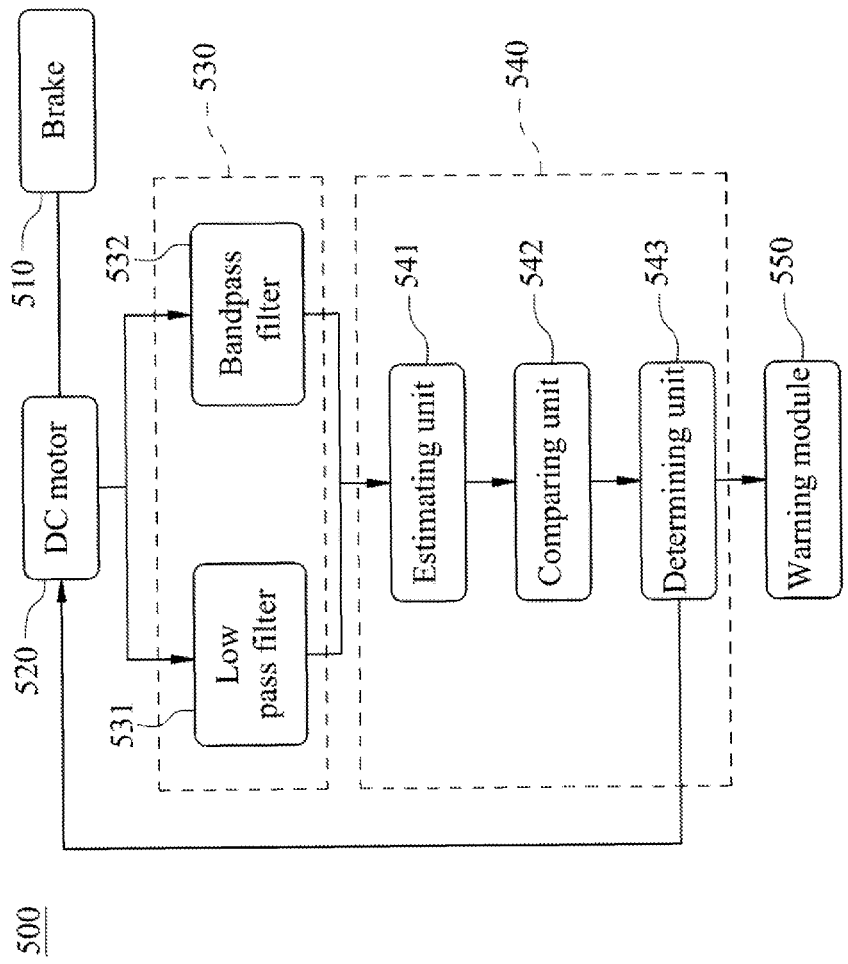
FIG. 5 is a components connecting schematic diagram of a fault warning system of an electric parking brake according to another embodiment of the present disclosure.

FIG. 5 is a schematic diagram of a fault warning system 500 of an electric parking brake according to another embodiment of the present disclosure. The fault warning system 500 of the electric parking brake includes a brake 510, a DC motor 520, a current sensing module 530, a signal processing module 540 and a warning module 550.

The brake 510 is a disk brake and includes a caliper and a disk rotor (not shown).

The DC motor 520 is coupled to the brake 510 for actuating the brake 510, and the DC motor transmits an armature current $i_a$. The DC motor 520 is a brushed DC motor, and the DC motor 520 drives the caliper to clamp the disk rotor for braking.

The current sensing module 530 is electrically connected to the DC motor 520, and the current sensing module 530 includes a low pass filter 531 and a bandpass filter 532. The low pass filter 531 converts the armature current $i_a$ to a low frequency current $i_{DC}$, wherein the low frequency current $i_{DC}$ is a direct current. The bandpass filter 532 converts the armature current $i_a$ to a high frequency current $i_{AC}$, wherein the high frequency current $i_{AC}$ is an alternating current.

The signal processing module 540 is connected to the current sensing module 530, and the signal processing module 540 includes an estimating unit 541, a comparing unit 542 and a determining unit 543. The estimating unit 541 receives the low frequency current $i_{DC}$ from the low pass filter 531 and estimates a braking force (F) by the above formula (1). Further, the estimating unit 541 also receives the high frequency current $i_{AC}$ from the bandpass filter 532 and estimates a motor rotating speed (N) by the above formula (2). The comparing unit 542 is electrically connected to the estimating unit 541, and the comparing unit 542 includes a predetermined braking force range ($F_{set}$) and a predetermined rotating speed range ($N_{set}$). The comparing unit 542 compares the braking force (F) with the predetermined braking force range ($F_{set}$) and outputs a braking force comparing signal. The comparing unit 542 also compares the motor rotating speed (N) with the predetermined rotating speed range ($N_{set}$) and outputs a rotating speed comparing signal. The determining unit 543 is electrically connected to the comparing unit 542, and the determining unit 543 generates and outputs a determining result after analyzing the braking force comparing signal and the rotating speed comparing signal.

Figure 6:
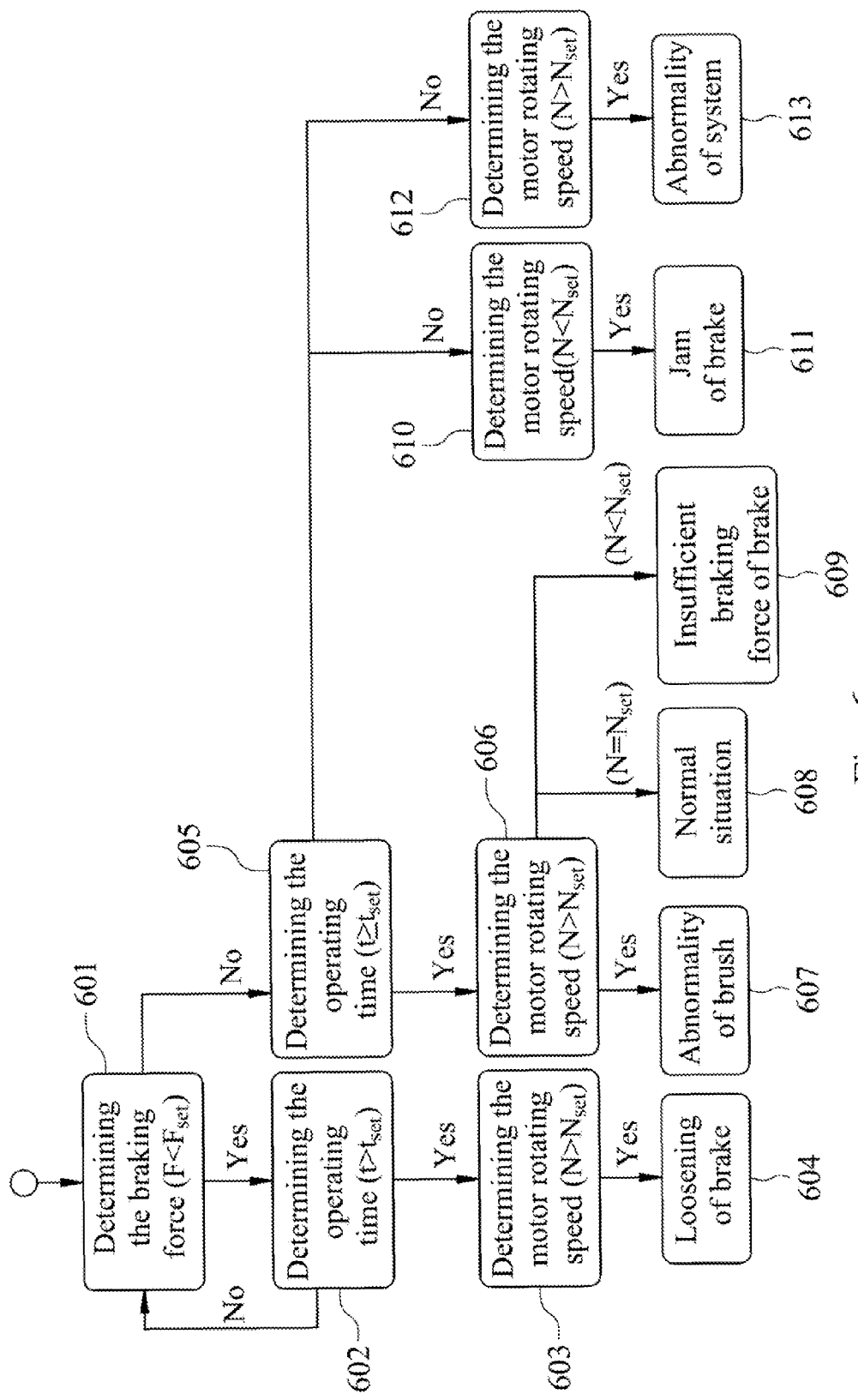
FIG. 6 is a flowchart showing the detail analysis of a determining unit in the FIG. 5.

FIG. 6 is a flowchart showing the detailed analysis of a determining unit 543 in the FIG. 5. The determining unit 543 analyses the braking force (F), an operating time (t) and the motor rotating speed (N) in order. The operating time (t) is the duration for reducing the motor rotating speed (N) to a specific value after activating the brake 510. Furthermore, the predetermined braking force range ($F_{set}$), the predetermined rotating speed range ($N_{set}$) and a predetermined operating time ($t_{set}$) are built-in the determining unit 543 previously. In step 601, the braking force (F) is determined; if the braking force (F) is less than the predetermined braking force range ($F_{set}$), the operating time (t) can be determined in step 602. In step 602, if the operating time (t) is less than the predetermined operating time ($t_{set}$), step 601 would be re-executed, that is, the braking force (F) would be determined again; otherwise if the operating time (t) is greater than the predetermined operating time ($t_{set}$), the motor rotating speed (N) would be determined in step 603. In step 603, if the motor rotating speed (N) is greater than the predetermined rotating speed range ($N_{set}$), a determining result 604 would be generated and outputted, wherein the determining result 604 is a loosening of brake.

In step 601, if the braking force (F) is greater than the predetermined braking force range ($F_{set}$), the operating time (t) would be determined in step 605. In step 605, if the operating time (t) is greater than or equal to the predetermined operating time ($t_{set}$), the motor rotating speed (N) would be determined in step 606. In step 606, if the motor rotating speed (N) is greater than the predetermined rotating speed range ($N_{set}$), a determining result 607 would be generated and outputted, wherein the determining result 604 is an abnormality of brake. However, if the motor rotating speed (N) is equal to the predetermined rotating speed range ($N_{set}$) a determining result 608 would be generated and outputted, wherein the determining result 608 is a normal situation. Furthermore, if the motor rotating speed (N) is less than the predetermined rotating speed range ($N_{set}$), a determining result 609 would be generated and outputted, wherein the determining result 609 is an insufficient braking force of brake.

In step 605, if the operating time (t) is less than the predetermined operating time ($t_{set}$), the motor rotating speed (N) would be determined in step 610 or step 612. In step 610, if the motor rotating speed (N) is less than the predetermined rotating speed range ($N_{set}$), a determining result 611 would be generated and outputted, wherein the determining result 611 is a jam of the brake. In step 612, if the motor rotating speed (N) is greater than the predetermined rotating speed range ($N_{set}$), a determining result 613 would be generated and outputted, wherein the determining result 613 is an abnormality of system.

The warning module 550 is electrically connected to the signal processing module 540. The warning module 550 receives the determining result, and then the warning module 550 generates and outputs a warning signal corresponding with the determining result. The warning signal is a warning sound for reminding the user that the brake 510 is loosen, a yellow light on a dashboard for reminding the user to check the brush of the DC motor or a green light on the dashboard for presenting that the electric parking brake is working well.

The warning signal also can be an image showing on a vehicle display system for presenting the insufficient braking force of brake and the abnormality of system.

Additionally, when the determining unit 543 generates the determining result 609 presenting the insufficient braking force of brake, the determining unit 543 can further generate an auxiliary braking signal to the DC motor 520, thus the DC motor 520 actuates the brake 510 again for providing an auxiliary braking force.

In the fault warning system 500 of the present disclosure, the armature current $i_a$ is varied when the DC motor 520 actuates the brake 510. The armature current $i_a$ is converted to the low frequency current $i_{DC}$ and the high frequency current $i_{AC}$ by the current sensing module 530. The signal processing module 540 generates the determining result for determining the operating status of the electric parking brake by comparing the low frequency current $i_{DC}$ and the high frequency current $i_{AC}$. If the determining result presents that the electric parking brake is unusually operating, the mentioned fault warning system 500 could warn the user immediately. Furthermore, the fault warning system 500 of the present disclosure actuates the brake 510 for providing the auxiliary braking force, and the auxiliary braking force prevents a crash caused by an abnormal operating of the electric parking brake.

As mentioned of the embodiments, the fault warning method and system of the electric parking brake have the following advantages: 1. The present disclosure can efficiently determines and immediately reminds the user the operating status of the electric parking brake. 2. When the electric parking brake abnormally works, the present disclosure not only warns the user but also provides the auxiliary braking force for preventing the crash. 3. The present disclosure can operate without a force sensor thereby the manufacturing cost of the electric parking brake can be reduced efficiently.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fault warning method of an electric parking brake, comprising:
    actuating a brake with a motor;
    transmitting an armature current from the motor;
    converting the armature current to a low frequency current and a high frequency current;
    estimating a braking force by the low frequency current, and estimating a motor rotating speed by the high frequency current;
    comparing the braking force with a predetermined braking force range, and outputting a braking force comparing signal;
    comparing the motor rotating speed with a predetermined rotating speed range, and outputting a rotating speed comparing signal;
    generating a determining result by determining the braking force comparing signal and the rotating speed comparing signal; and generating a warning signal according to the determining result.

2. The fault warning method of claim 1, wherein the armature current is a ripple signal.

3. The fault warning method of claim 1, wherein the low frequency current is a direct current.

4. The fault warning method of claim 1, wherein the high frequency current is an alternating current.

5. The fault warning method of claim 1, wherein the determining result is a loosening of brake, a jam of brake, an insufficient braking force of brake, an abnormality of brush or a normal situation.

6. The fault warning method of claim 1, wherein the warning signal is a sound, a light, a pattern, a vibration, an image, or an electric control signal.

7. The fault warning method of claim 1, wherein when the determining result is the insufficient braking force of brake, the fault warning method further comprises:
generating an auxiliary braking signal to control the motor for providing an auxiliary braking force.

8. A fault warning system of an electric parking brake, comprising:
a brake;
a DC motor coupled to the brake, and for transmitting an armature current;
a current sensing module connected to the DC motor, the current sensing comprising:
a low pass filter for converting the armature current to a low frequency current; and
a bandpass filter for converting the armature current to a high frequency current;
a signal processing module connected to the current sensing module, the signal processing module comprising:
an estimating unit receiving the low frequency current for estimating a braking force and the high frequency current for estimating a motor rotating speed;
a comparing unit connected to the estimating unit, and the comparing unit comprising a predetermined braking force range and a predetermined rotating speed range, wherein the comparing unit compares the braking force with the predetermined braking force range and compares the motor rotating speed with the predetermined rotating speed range, and the comparing unit outputs a braking force comparing signal and a rotating speed comparing signal; and
a determining unit connected to the comparing unit for analyzing the braking force comparing signal and the rotating speed comparing signal and generating a determining result; and
a warning module connected to the signal processing module, the warning module receiving the determining result for generating a warning signal.

9. The fault warning system of claim 8, wherein the armature current is a ripple signal.

10. The fault warning system of claim 8, wherein the low frequency current is a direct current.

11. The fault warning system of claim 8, wherein the high frequency current is an alternating current.

12. The fault warning system of claim 8, wherein the determining result is a loosening of brake, a jam of brake, an insufficient braking force of brake, an abnormality of brush or a normal situation.

13. The fault warning system of claim 8, wherein the warning signal is a sound, a light, a pattern, a vibration, an image, or an electric control signal.

14. The fault warning system of claim 8, wherein the estimating unit generates an auxiliary braking signal to the DC motor when the determining result is the insufficient braking force of brake, thus the DC motor actuates the brake for providing an auxiliary braking force.

* * * * *